United States Patent [19]

Batlivala et al.

[11] Patent Number: 4,475,243
[45] Date of Patent: Oct. 2, 1984

[54] ISOLATION METHOD AND APPARATUS FOR A SAME FREQUENCY REPEATER

[75] Inventors: Percy P. Batlivala, Arlington Heights; Richard S. Kommrusch, Schaumburg; Ronald H. Chapman, Wheaton, all of Ill.

[73] Assignee: Motorola, Inc., Schaumburg, Ill.

[21] Appl. No.: 451,984

[22] Filed: Dec. 21, 1982

[51] Int. Cl.³ .............................................. H04B 7/14
[52] U.S. Cl. ...................................... 455/22; 455/24; 455/78
[58] Field of Search ...................... 455/18, 22, 24, 78, 455/20, 79; 370/32; 343/100 LE, 100 CL

[56] References Cited

U.S. PATENT DOCUMENTS

| | | |
|---|---|---|
| 3,696,429 | 10/1972 | Tressa . |
| 3,737,783 | 6/1973 | Oswald et al. . |
| 3,938,153 | 2/1976 | Lewis et al. . |
| 3,938,154 | 2/1976 | Lewis . |
| 3,978,483 | 8/1976 | Lewis et al. . |
| 4,134,068 | 1/1979 | Richardson . |
| 4,317,217 | 2/1982 | Davidson et al. . |
| 4,363,129 | 12/1982 | Cohn et al. ............................ 455/22 |
| 4,383,331 | 5/1983 | Davidson .............................. 455/24 |

FOREIGN PATENT DOCUMENTS

| | | | |
|---|---|---|---|
| 133148 | 10/1980 | Japan ...................................... | 455/24 |
| 2065421 | 6/1979 | United Kingdom . | |

Primary Examiner—Jin F. Ng
Attorney, Agent, or Firm—Charles L. Warren; James W. Gillman; Edward M. Roney

[57] ABSTRACT

An apparatus for minimizing the spillover signal from the transmitter to the receiver in a same frequency repeater includes a mechanism for generating a receiver first injection signal carrying the modulation component of the transmitter signal, and a first mixer for mixing the received signals and the first injection signal to produce a first IF signal having one unmodulated IF component signal and another modulated IF component signal. A correlation and cancellation circuit is utilized to cancel the unmodulated IF component signal. A mechanism is provided for generating a second injection signal which carries the modulation component of the transmitter signal. A second mixer mixes the first IF signal and the second injection signal to produce a second IF signal such that the modulation component of the spillover signal is substantially cancelled. Time synchronization mechanisms are preferably provided to adjust the phase of the modulation component of the transmitted signal as carried by the first and second injection signals such that it arrives at the first and second mixers in phase synchronization with the modulation component of the spillover signal. This invention also contemplates a method for canceling the modulation component of the spillover signal.

17 Claims, 1 Drawing Figure

ISOLATION METHOD AND APPARATUS FOR A SAME FREQUENCY REPEATER

BACKGROUND OF THE INVENTION

This invention relates to an apparatus and method for minimizing the effect of spillover from the transmitter to the receiver in a same frequency repeater. Spillover refers to a portion of the transmitter signal which is undesirably coupled to the receiver.

A same frequency repeater "SFR" consists of a receiver for receiving a signal at a given frequency and a transmitter for rebroadcasting the received signal at the same frequency. An SFR can be advantageously employed in a communication system to conserve the frequencies or channels required since the SFR reuses the frequency of the received signal by rebroadcasting the received information on the same frequency. By contrast, a conventional repeater receives a signal at a given frequency and rebroadcasts the recovered information at a different frequency. Electrical isolation between the transmitter and receiver in a conventional repeater is more easily attained due to the difference in transmit and receive frequencies.

Isolation between the receiver and transmitter of an SFR at least equal to the gain of the repeater is required in order to prevent oscillation which could result from feedback of the transmitted signal into the receiver, that is, the spillover. Since an SFR may have a gain of a 100 db or greater, isolation becomes an important consideration.

The reception of a first voice encoded signal and a second feedback signal encoded with the same voice information delayed in time by 100 microseconds or more with respect to the first signal will produce distortion. Because the spillover signal from the transmitter of the SFR is time delayed with respect to the received signal, it constitutes a feedback signal which can produce distortion. Thus, it is desirable to minimize the spillover from the transmitter to the receiver of the voice signal carried by the transmitted signal.

PRIOR ART

Various types of apparatus have been utilized in an attempt to minimize an interfering or undesired signal having the same frequency as the desired signal. In U.S. Pat. Nos. 3,938,153; 3,938,154 and 3,978,483 correlation and cancellation circuits commonly referred to as $C^2$ circuits are employed in a radar system to cancel signals received by side lobes of the primary antenna. These radar systems address the problem of cancellation of low level signals by the use of a plurality of antennas.

United Kingdom patent application GB 2,065,421 published June 24, 1981, discloses an SFR in which unwanted feedback between the transmitter aerial and the receiver aerial is cancelled. The received signals are converted to base band (audio frequency) signals and processed by correlation and phase quadrature circuits to achieve cancellation of the unwanted transmitter feedback signal. In U.S. Pat. No. 4,134,068, a non-reciprocal junction device provides isolation between the transmitter signal and the receiver signal in an SFR where a common antenna is utilized.

U.S. Pat. No. 3,737,783 is directed to an apparatus for improving the signal to noise ratio for receiving systems having two antennas. This apparatus uses the sum and difference of the two received signals to achieve an improved signal to noise ratio.

A signal cancellation system is disclosed in U.S. Pat. No. 3,696,429 wherein the undesired RF signal received by a receiver from an nearby transmitter is reduced. Where the local transmitter is operating on the same frequency as the receiver, the transmitter is modulated with a tag signal in order to separate the undesired transmitter signal from the received signal. Another example of a cancellation system requiring a tag to be encoded on the local transmitter is disclosed in U.S. Pat. No. 4,317,217.

SUMMARY OF THE INVENTION

The purpose of this invention is to minimize the spillover from the transmitter to the receiver in a SFR. More specifically, this invention addresses the problem of cancelling the modulation component of the transmitter output signal which is coupled to the receiver by the spillover signal.

An embodiment of the present invention includes a circuit means coupled to the receiver for substantially cancelling the information carried by the spillover signal without cancelling the information carried by the desired received signal. Thus, spillover signal interference with the information by the desired signal is minimized.

The cancelling circuit means includes a sampling means for producing a sampled signal having an amplitude and phase proportional to the transmitter output signal. A means is provided for generating a first receiver injection signal derived from the sampled signal so that it contains the modulation component of the transmitter signal. A first mixer receives inputs of the first injection signal and the received signal, and produces a first IF signal. A correlation and cancellation circuit minimizes the carrier frequency component of the first IF signal. A means is provided for generating a second injection signal derived from the sampled signal. A second mixer receives the first IF signal and the second injection signal as inputs, and generates a second IF signal. The first and second injection signals are time delayed to be in time synchronization with the other input to the first and second mixers, respectively.

The first IF signal contains a frequency component modulated by the desired signal and the spillover signal. The second injection signal carries the modulation component of the transmitter output signal delayed in time such that it is in phase with the modulation component of the spillover signal. The modulation component of the spillover signal carried by the first IF signal is mixed with the second injection signal to generate a difference product which does not carry a spillover modulation component. Thus, cancellation of the information carried by the spillover signal occurs at the second IF signal. This minimizes interference between information carried by the spillover signal and information carried by the desired received signal.

DETAILED DESCRIPTION

Figure 1:
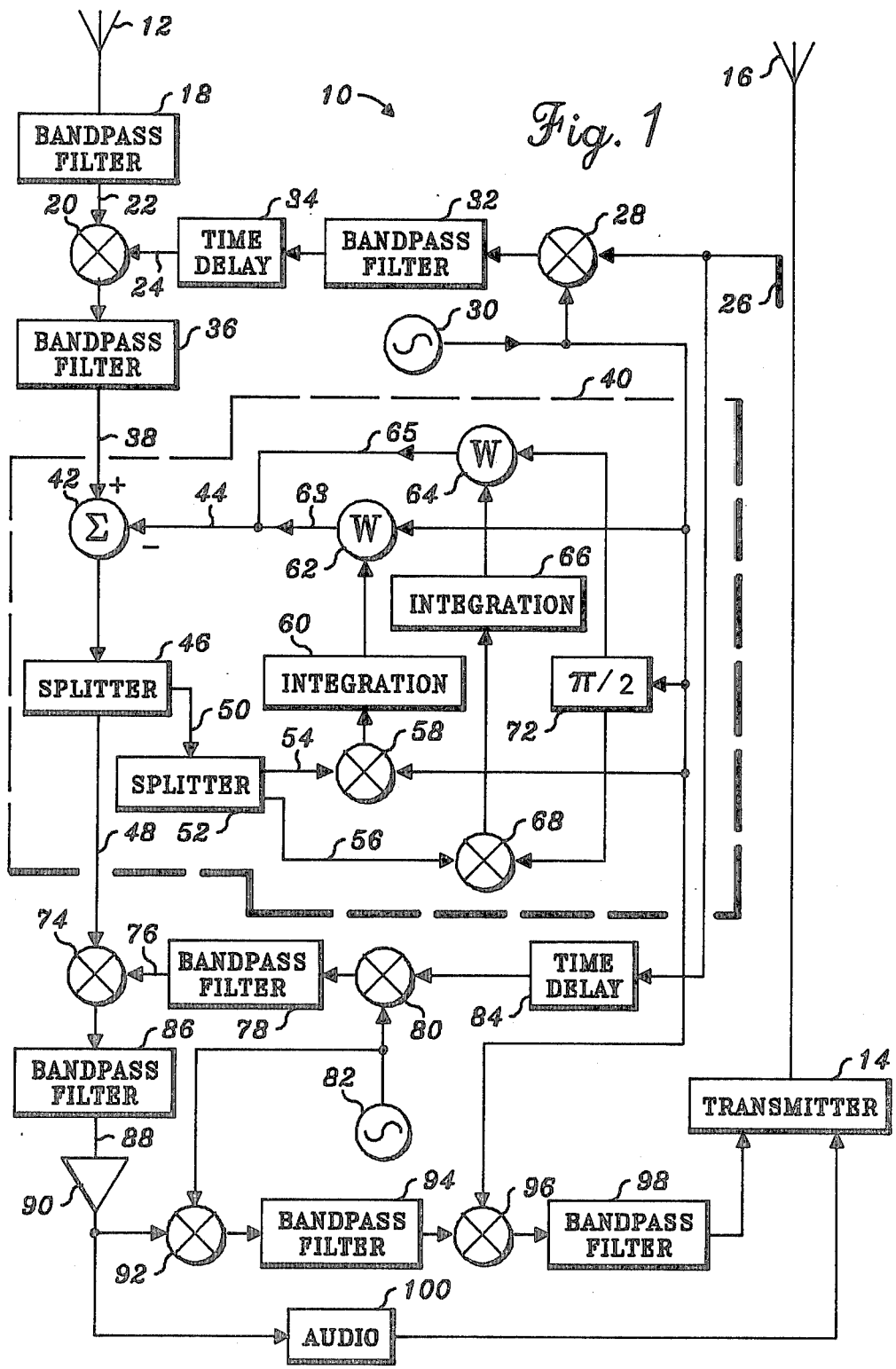
FIG. 1 is a block diagram illustrating an embodiment of the present invention.

The same frequency repeater 10 illustrated in FIG. 1 incorporates an embodiment of an improved spillover isolation apparatus according to the present invention. A receiving antenna 12 couples the received signal to the receiver of the SFR. A typical received signal will carry encoded information, such as a voice signal, which is recovered by the receiver as audio. A transmitter 14 having the same frequency as that of the received signal is encoded or modulated with the received audio and transmits the encoded signal by transmitting antenna 16. Even though conventional techniques are employed to achieve isolation between the transmitting antenna 16 and the receiving antenna 12, the receiving antenna and hence the receiver is subjected to a substantial level of the transmitted signal referred to as spillover or blow-by. The illustrative embodiment of this invention provides an apparatus for providing substantial cancellation of the carrier frequency component of the spillover signal as well as the voice modulated components of the spillover signal.

The desired received signal and the spillover signal are passed through bandpass filter 18 and applied to mixer 20 as input 22. The other input to mixer 20 consists of a receiver first injection signal 24 which is derived as follows. A portion of the transmitted signal is sampled by a samplying means 26, such as a directional coupler, that supplies a sampled signal having an amplitude and phase proportional to the transmitted signal as an input to mixer 28. The other input to mixer 28 is supplied by local oscillator 30. Bandpass filter 32 is tuned to pass the sum of the frequencies of the sampled signal and the local oscillator. Bandpass filters 18 and 32 preferably track, that is, have the same time delay. The output from bandpass filter 32, after being time delayed by adjustable time delay 34, comprises the receiver first injection 24. The time interval of delay circuit 34 is selected such that the first injection signal 24 as derived from the sampled transmitter signal arrives at mixer 20 at the same time (in phase with) the spillover signal applied to mixer 20 at input 22. The delay circuit 34 compensates for the propagation delay of the spillover signal from transmitting antenna 16 to receiving antenna 12 and processing delays. Bandpass filter 36 is tuned to select the difference frequency product from mixer 20. The output 38 of bandpass filter 36 is applied to a correlation and cancellation circuit 40.

Correlation and cancellation circuit 40 functions as a tracking notch filter to provide a substantial level of cancellation of the carrier frequency component of the spillover signal as carried by the receiver first intermediate frequency (IF) 38. A summation circuit 42 receives the IF 38 as one input and adds a derived cancellation signal 44 to provide an output to splitter 46 which splits the input signal to provide output signals 48 and 50. Another splitter 52 receives output 50 and splits this signal into components 54 and 56. A mixer 58 generates the difference product between input 54 and the other input which is the output of first local oscillator 30. The output of mixer 58 is integrated by integration circuit 60 and applied to a weighting circuit 62 which controls the amplitude of signal 63 derived from first injection oscillator 30. The weighting circuit 62 may be a conventional type such as a circuit utilizing a pin diode to control attenuation.

The cancellation signal 44 consists of the signal 63 of weighting circuit 62 summed with the signal 65 of weighting circuit 64. It will be apparent from FIG. 1 that weighting circuit 64, integration circuit 66 and mixer 68 provide a complementary function to weighting circuit 62, integration circuit 60 and mixer 58, respectively. Phase shifting (time delaying) circuit 72 shifts the output signal of oscillator 30 by 90 degrees.

Similarly, the input to weighting circuit 64 from oscillator 30 is shifted by 90 degrees. The outputs 63 and 65 of the weighting circuits represent orthogonal vectors whose amplitude can be controlled to produce a resultant vector (cancellation signal 44) being equal in amplitude but opposite in phase to the carrier frequency component of the spillover signal carried by IF 38. Thus, the correlation and cancellation circuit 40 substantially reduces the magnitude of the carrier frequency component of the spillover signal at the first intermediate frequency.

The output 48 of the correlation and cancellation circuit 40 provides one input to mixer 74. The other input 76 to mixer 74 is derived as follows. Bandpass filter 78 is tuned to select the difference frequency product from mixer 80 having as inputs a signal generated by local oscillator 82 and the sampled signal of the transmitter output as delayed by time delay circuit 84. The time interval of delay circuit 84 is selected to achieve the same results as that of time delay circuit 34, that is, to provide a second injection signal 76 which is in phase or time synchronization with the other input signal 48 applied to mixer 74. Bandpass filter 86 is tuned to pass the difference frequency product 88 from the output of mixer 74 to IF amplifier 90.

An important aspect of the present invention is that the modulation component or audio of the spillover signal carried by first IF signal 48 has been substantially cancelled at second IF signal 88 as a result of the derivation of the receiver rejection signals 24 and 76, and the mixing products generated by mixers 20 and 74. In the illustrative embodiment, the modulation component carried by the first injection signal 24 is in phase with the modulation component of the received spillover signal at mixer 20. The IF signal 48 from circuit 40 contains modulation components of the spillover signal and the desired received signal. The second injection signal 76 carries a modulation component of the transmitter signal delayed to be in phase with the modulation component of the spillover signal carried by IF signal 48. Thus by selecting the difference product from mixer 74 the spillover modulation component is cancelled. A more complete understanding of the cancellation of the audio component of the spillover signal is provided by the mathemathical analysis provided below.

The local oscillators, from which injection signals for the receiver are derived, are also utilized to control the frequency of transmitter 14. The IF signal at amplifier 90 is mixed by mixer 92 with the output of local oscillator 82 and the sum frequency selected by bandpass filter 94. The output of bandpass filter 94 is mixed with the output frequency of oscillator 30 by mixer 96. The sum of these frequencies is passed by bandpass filter 98 and applied to transmitter 14. It will be apparent to those skilled in the art that the transmitter must operate at a frequency equal to that of the received signal since the receiver injection oscillators are utilized to derive the transmitter frequency.

An audio recovery circuit 100 is utilized to recover the audio from the output of IF amplifier 90. This audio is utilized to modulate transmitter 14 so that the transmitter will carry the same encoded information.

In the following mathematical analysis of the cancellation accomplished by the present invention, each mathemathical expression is identified by a primed number and represents a signal referenced in FIG. 1 by the corresponding number. The receiver input signals are represented by:

$$A \cos(wt+\phi_a) + B \cos(wt+\phi_b) \quad \quad 22'$$

where the first term corresponds to the desired received signal having a frequency of w and carrying an FM encoded voice signal $\phi_a$, and where the second term represents the spillover signal also having a frequency of w and carrying modulation information as $\phi_b$. The first receiver injection signal is represented as:

$$C \cos[(w+w_1)t+\phi_b] \quad \quad 24'$$

where the frequency of local oscillator 30 is $w_1$. The output of mixer 20 as filtered by bandpass filter 36 is represented as:

$$(BC/2) \cos w_1 t + (AC/2) \cos(w_1 t + \phi_b - \phi_a) \quad \quad 38'$$

which represents the difference product of 22' and 24'. The first term in 38' corresponds to the carrier frequency component of the spillover signal at the IF having an amplitude proportional to that of the spillover signal, that is, B.

The purpose of the correlation and cancellation circuit 40 is to provide a cancellation signal 44 which will result in the cancellation of the first term in 38'. The cancellation signal 44 may be represented as:

$$KD \cos w_1 t \quad \quad 44'$$

wherein D represents the input magnitude of local oscillator 30 and K represents a weighting factor controlled by a weighting circuits 62 and 64. The output of summing circuit 42 after being split by splitter 46 maybe represented as:

$$[(BC-KD)/2] \cos w_1 t + (AC/2) \cos(w_1 t + \phi_b - \phi_a) \quad \quad 48'$$

which is derived by subtracting term 44' from 38'. The correlation and cancellation circuit 40 controls the weighting factor K such that K=BC/D. By substituting the equivalent of K in 48', it will be apparent that the first term becomes zero; 48' may be expressed as:

$$(AC/2) \cos(w_1 t + \phi_b - \phi_a) \quad \quad 48''$$

Therefore, the output from the correlation and cancellation circuit 40 as represented by 48'' consists of a term at the first IF ($w_1$) including the desired modulation information $\phi_a$ and the undesired spillover modulation information $\phi_b$.

The second receiver injection signal 76 is represented as:

$$E \cos[(w-w_2)t+\phi_b] \quad \quad 76'$$

wherein $w_2$ is the frequency of local oscillator 82 and the undesired modulation component $\phi_b$ is derived from the sampled transmitter signal. The difference output of mixer 74 (76'−48'') after being filtered by bandpass filter 86 is represented as:

$$(ACE/4) \cos[(w-w_2-w_1)t+\phi_a] \quad \quad 88'$$

wherein $w-w_2-w_1$ equals the second IF. It will be noted that the undesired modulation term $\phi_b$ is not present in 88' indicating that same has been cancelled. Thus, the signal at 88 is represented by cosine function having a frequency of the second IF which carries the desired modulation component $\phi_a$. Of course, it will be apparent to one skilled in the art in light of this disclosure that $\phi_b$ can be cancelled either by selecting the difference product of mixer 74 if the inputs carry $\phi_b$ in phase or by selecting the sum product of mixer 74 if the inputs carry $\phi_b$ in a 180° phase relationship.

The desired modulation component is recovered by a conventional audio recovery circuit 100 which may consist of a discriminator for recovering a frequency or phase modulated signal.

The method utilized in the present invention includes the step of generating a first receiver injection signal derived from a sampled transmitter output signal, such that the injection signal includes the modulation component of the transmitter signal delayed to be in phase with spillover signal. This injection signal is mixed with the input receiver signals which consist of the desired signal and the undesired spillover signal resulting in a first unmodulated frequency component and a second frequency component which carries the undesired and the desired modulation components. The unmodulated frequency component is cancelled by means of a correlation and cancellation circuit leaving only the second frequency component carrying the desired and undesired modulation components. The second receiver injection signal is derived utilizing a sampled signal of the transmitter output signal, such that the second injection signal carries the modulation component of the transmitter delayed to have a phase angle X according to X=Y+(N) 180° where Y is the phase angle of the undesired modulation component carried by the first IF signal and N is an integer. The second receiver injection signal is mixed with the first receiver IF signal and the mixing product selected to produce a second IF signal in which the undesired modulation is cancelled leaving only the desired modulation component.

It is important that the undesired modulation component of the spillover signal be substantially cancelled or reduced in amplitude to prevent distortion from occurring due to the presence of the feedback signal.

Although a preferred embodiment of the present invention has been described above and illustrated in the drawing, the scope of the present invention is defined by the claims appended hereto.

What is claimed is:

1. In a same frequency repeater having a receiver for receiving a desired signal at a given frequency and a transmitter for transmitting an output signal at said given frequency, the desired signal having a first modulation component carrying certain information and the output signal having a second modulation component carrying said information, input signals to the receiver including said desired signal and a spillover signal consisting of said output signal delayed in time, the improvement comprising:

a. first receiver means for generating an IF signal carrying said first modulation component and the modulation component of said spillover signal;
   b. second receiver means for generating an injection signal carrying said second modulation component;
   c. third receiver means for controlling the phase of one of said second modulation component carried by said injection signal and said modulation component of the spillover signal carried by said IF signal relative to the other according to X=Y+(N) 180° where X is the phase angle of said one, Y is the phase angle of said other, and N is an integer; and d. fourth receiver means for mixing said IF signal and said injection signal to produce a resultant signal in which said one substantially cancels said other whereby the modulation component of the spillover signal is substantially cancelled from said resultant signal.

2. The improvement according to claim 1 wherein said second generating means includes means for sampling said output signal of the transmitter.

3. The improvement according to claim 1 wherein said third means comprises a time delay circuit for delaying said one modulation component.

4. In a same frequency repeater having a receiver for receiving a desired signal at a given frequency and a transmitter for transmitting an output signal at said given frequency, the desired signal having a first modulation component carrying certain information and the output signal having a second modulation component carrying said information, input signals to the receiver including said desired signal and a spillover signal consisting of said output signal delayed in time, the improvement comprising:
  a. means for generating a receiver first injection signal carrying said second modulation component delayed in time to be in phase with said spillover signal;
  b. first mixing means for mixing said receiver input signals and said first injection signal to produce a first IF signal having one IF component signal which does not carry said first modulation component nor said second modulation component, and another IF component signal which carries said first modulation component and the modulation component of the spillover signal;
  c. means for substantially cancelling said one IF component signal;
  d. means for generating a second injection signal carrying said second modulation component delayed in time to have a phase angle X wherein $X = Y + (N) 180°$, where Y is the phase angle of the modulation component of the spillover signal carried by said another IF component signal and N is an integer; and
  e. second mixing means for mixing said another IF component signal and said second injection signal to produce a second IF signal in which the modulation component of said spillover signal is substantially cancelled and in which said first modulation component of said desired signal is present.

5. The improvement according to claim 4 wherein said first injection generating means includes a first time synchronization means for controlling the arrival of said first injection signal at said first mixing means so that said second modulation component carried by the first injection signal arrives in phase at the first mixing means with the modulation component of the spillover signal.

6. The improvement according to claim 5 wherein said first time synchronization means comprises an adjustable time delay circuit coupled to said first injection generating means for delaying said second modulation component carried by said first injection signal.

7. The improvement according to claim 4 wherein said cancelling means comprises a correlation and cancellation circuit.

8. The improvement according to claim 4 wherein said second injection generating means includes a time synchronization means for controlling the phase of said second modulation component carried by the second injection signal relative to the modulation component of the spillover signal carried by the first IF signal.

9. The improvement according to claim 8 wherein said time synchronization means comprises a time delay circuit coupled to said second injection generating means for delaying said second modulation component carried by said second injection signal.

10. The improvement according to claim 4 wherein said first injection generating means comprises a first local oscillator, means for sampling the output signal of said transmitter, and a third mixing means for mixing a signal from the first local oscillator and a sample signal from the sampling means.

11. The invention according to claim 10 further comprising a bandpass filter means coupled to said third mixing means for selecting the resulting summation product from the third mixing means.

12. The improvement according to claim 4 wherein said second injection generating means comprises a local oscillator, means for sampling the output signal of said transmitter, and a third mixing means for mixing a signal from said second local oscillator and a sample signal from said sampling means.

13. The improvement according to claim 12 further comprising a bandpass filter means coupled to said third mixer means for selecting the resultant difference output product of said fourth mixing means.

14. A method for substantially cancelling the modulation component of the spillover signal received by the receiver in a same frequency repeater (SFR) from the transmitter in the SFR, said method comprising the steps of:
  a. generating a receiver first injection signal carrying the modulation component of the transmitter signal;
  b. mixing the received signal and said first injection signal to produce a first IF signal having one IF signal which does not carry the modulation component of the spillover signal nor the modulation component of a desired received signal, and another IF signal which carries the modulation component of the spillover signal and the modulation component of the desired received signal;
  c. substantially cancelling said one IF signal;
  d. generating a receiver second injection signal carrying the modulation component of the transmitter signal; and
  e. mixing said another IF signal and said second injection signal to produce a receiver second IF signal in which said modulation component of said spillover signal is substantially cancelled and in which said modulation component of the desired signal is present.

15. The method according to claim 14 further comprising the step of synchronizing the first injection signal with the received spillover signal so that the modulation component of the transmitter signal arrives at a first mixer in phase with the modulation component of the spillover signal.

16. The method according to claim 14 further comprising the step of synchronizing the second injection signal with the first IF signal such that the modulation component of the transmitter signal has a phase angle X according to $X = Y + (N) 180°$ where Y is the phase angle of the spillover modulation component carried by the IF signal, and N is an integer.

17. A method for substantially cancelling the modulation component of the spillover signal received by the receiver in a same frequency repeater (SFR) from the transmitter in the SFR, wherein said receiver receives a desired signal having a first modulation component and the transmitter transmits an output signal having a second modulation component, the spillover signal consisting of said output signal delayed in time, said method comprising the steps of:

a. generating a receiver IF signal carrying said first modulation component and the modulation component of said spillover signal;

b. generating a receiver injection signal carrying said second modulation component;

c. controlling the phase of one of said second modulation component carried by said injection signal and said modulation component of the spillover signal carried by said IF signal relative to the other according to $X=Y+(N)\ 180°$ where X is the phase angle of said one, Y is the phase angle of said other, and N is an integer; and d. mixing said IF signal and said injection signal to produce a resultant signal in which said one substantially cancels said other whereby the modulation component of the spillover signal is cancelled from said resulting signal.

* * * * *